Patented May 5, 1931

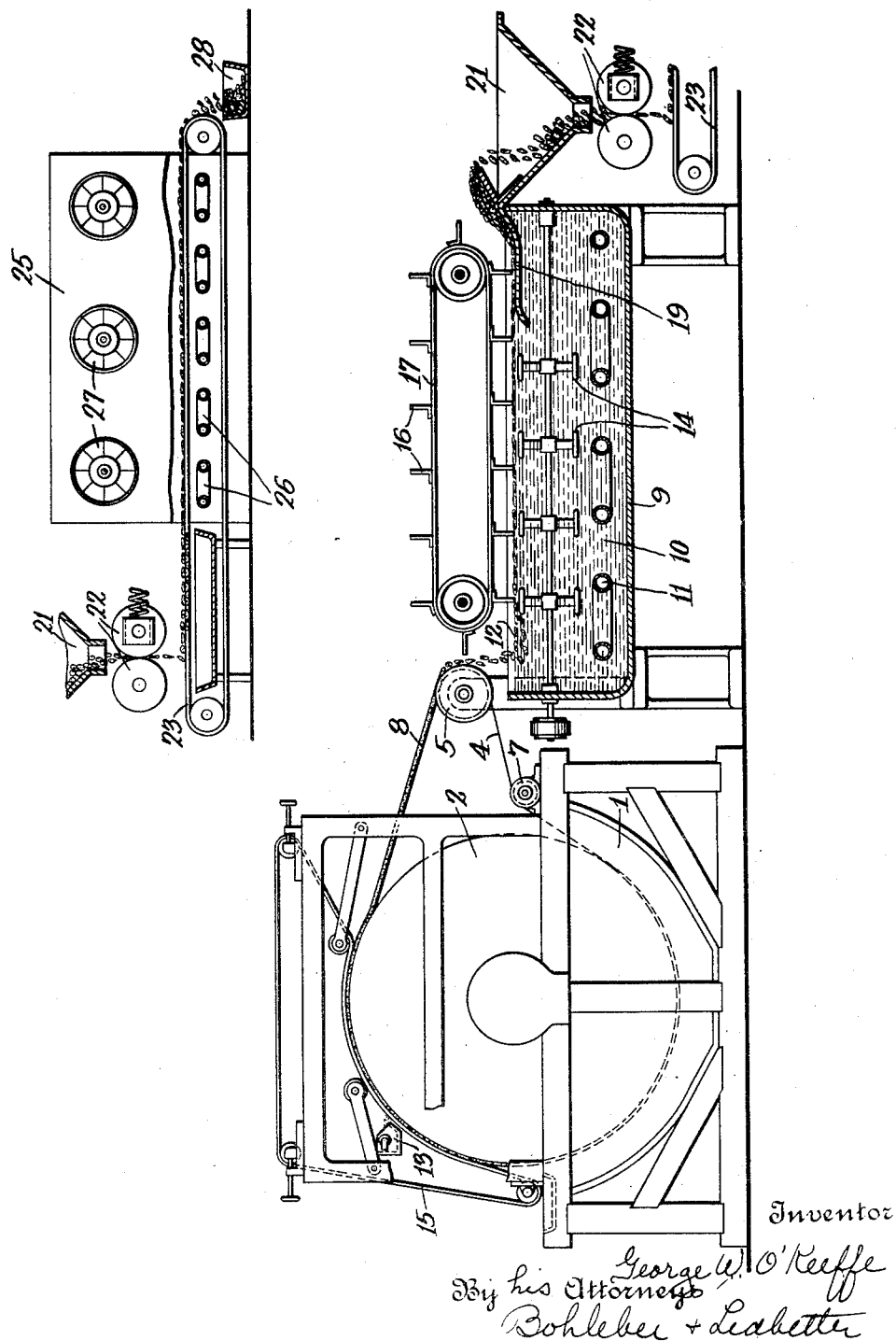

1,803,767

UNITED STATES PATENT OFFICE

GEORGE W. O'KEEFFE, OF NEW ROCHELLE, NEW YORK

DRYING

Application filed January 8, 1927. Serial No. 159,832.

This invention relates to the drying of substances and more particularly to a method of drying substances having particular characteristics.

The substances to which the method, according to the present invention, is applicable may be illustrated by that used in the manufacture of phonograph records and the like wherein a gum, like shellac, in flake form is dissolved in an alkali, and the solution resulting therefrom is treated with an acid which precipitates the substance. A recovery is then had of the precipitated substance suspended in the liquid. When recovered, the substance has a granular consistency, very like moist sand, and has entrained therein some of the water and other liquids in which it has been suspended and from which it has been precipitated, so that the granular composition has a considerable quantity of fluid entrained therein, say 50%. Ordinary methods of drying this substance in air and by heat require an excessive time, not less than four hours in commercial practice, to accomplish satisfactory drying.

The present invention seeks to reduce and simplify the recovery of the precipitate in a convenient and inexpensive manner. To this end the precipitate is recovered by filtration and a slurry, such as the acid treated solution aforementioned, in which the precipitate is suspended is filtered and the filter cake subjected to a washing and dewatering process and then to a liquid removal process.

It has been discovered that such substances as illustrated are repellant to entrained fluids at certain temperatures for within a certain range of temperature. Therefore, according to the present invention, the substance, as recovered by any method but conveniently by filtration, is then subjected to that temperature at which such substance is water repellant. I have found that one substance, such as hereinbefore described, is water repellant when raised to approximately 120° F. Upon raising to this predetermined temperature from substantially room temperature the substance acquires a soft and spongy consistency or a plastic amorphous structure and the water is expelled.

In carrying out the invention it is preferred to raise the temperature of the substance by immersing it in a fluid which has the desired temperature. The substance floats and has a capacity to agglomerate. It is to be understood that the agglomeration is not incident to or a result of the expulsion of the fluid content. Agglomeration may be effected by agitation, which I prefer to carry on simultaneously with the fluid expulsion step as a matter of convenience. Upon removing the substance from contact with the hot fluid it is found that the entrained fluid has been practically entirely expelled. The major portion of the fluid entrained in the substance is found to be water and in carrying out my invention I prefer to perform the step of removing the entrained water by immersion in a bath of water raised to the critical temperature or within the critical range of temperatures, at which the substance expels the entrained fluid.

It is a further object of the invention to provide a method of recovering the practically dry substance from suspension in fluid which includes as a step the recovery by filtration of the substance from the solution from which it has been precipitated.

These and other objects of the invention and the means for their attainment will be apparent from the following detailed description taken in connection with the accompanying drawings illustrating means whereby the method may be carried out.

It is to be understood that while a compound which is formed by the precipitation of solids from a gum solution is referred to by way of illustration, the invention is not to be deemed limited to that material but is applicable to any substances which may be found repellant to entrained fluid at a critical temperature or range of temperatures.

The precipitate suspended in the solution may be recovered in various ways, as by means of mechanical separation. It is preferred to recover the precipitate by a filter and particularly a filter of the continuous rotary drum type. Upon recovery the substance may then be washed to free it of chemicals such as free acid and soluble salts.

A convenient manner of carrying out the washing is by means of washing devices associated with continuous rotary type filters. Thereafter, a dewatering step may be availed of which, in connection with filtration, may reside in drawing the water out of the filter cake by the suction of the filter, aided, if desired, by pressure rolls and/or a compressor belt. The precipitate or substance so recovered, which at this stage of operation may be referred to as a filter cake, if recovered by filtration, now has a granular moist structure having entrained within it, in some instances, approximately 50% of moisture. Advantage is taken of the characteristics of the material, which I have discovered, wherein the fluid entrained therein is repelled or expelled upon causing the substance to react in a peculiar manner. I have discovered that these substances may be caused to be water repellant by raising them to a certain temperature or within a range of temperatures, that is, between a minimum and a maximum temperature. This may be conveniently accomplished by bringing a fluid raised to the desired temperature in intimate contact with the substance. For instance the intimate contact of heated water has been found to give excellent results and I prefer therefore to cause the substance to become fluid repellant by immersing the same in water raised to a predetermined temperature. The subjection of the substance to a hot fluid may require no more than two or three minutes to cause an expulsion of the entrained fluid. At this minimum predetermined temperature the substance may also begin to soften.

For convenience in handling it is desirable to agglomerate the substance and I have found that agitation carried on subsequently to the water repelling step or simultaneously therewith will cause the substance to agglomerate.

The substance may then be removed from contact with the heated fluid and its fluid load which is then practically all surface moisture will be found to be approximately 10%. Drainage permits the reduction of surface moisture to approximately 4%.

In situations where the permissible moisture content is, say 1%, the substance may be passed through pressure rolls which squeeze the small quantity of fluid which may have become entrained in the lumps to the surface some of which falls immediately therefrom and thereafter the surface fluid may be caused to "flash-off" by a subsequent drying step. For instance the substance may be caught, after it passes from between the pressure rolls, upon a screen conveyor which will pass fluid squeezed therefrom and which will carry the substance through recirculated hot air for a period sufficient to permit the surface moisture to evaporate. This has been found in some situations to be not longer than three minutes.

The accompanying drawing shows a vertical section of my machine.

Referring now to the drawings, a slurry comprising a liquid in which a precipitate is suspended is contained within the tank 1. Upon this tank is rotatably mounted a filter drum 2 of the continuous filter type. About the drum is disposed a conveying reenforcement 4 which may take the form of an endless mesh belt or a plurality of spaced, preferably parallel, separate strands encircling the drum and a terminal roll 5. Another peripherally grooved roll, such as the roll 7, which, if spaced strands are used may be availed of to guide and direct the reenforcement back on the drum. The filter cake formed on the periphery of the drum in the cake forming zone is deposited in the interstices of the reenforcement and buids up about the same in the form of a cake. The manner in which the cake reenforcement operates will not be described in detail since it forms the subject matter of copending applications and issued patents, reference being had to Patent No. 1,472,574 dated October 30, 1923 and issued to Arthur Wright and F. W. Young as illustrating one type of reenforcement applicable in this situation. The cake 8 may be conveyed away from the filter drum by the reenforcement to the roll 5 which may be an idler roll or may be caused to rotate in synchronism with the filter drum. Obviously, the use of other means to discharge the filter cake from the filter is within the purview of the invention.

To remove free acid and soluble salts the filter cake 8 is washed, that is, water from a tank 13, may be permitted to freely flow over the surface of the cake and be drawn therethrough by the action of the suction within the drum. This water or any such remaining in the cake may then be withdrawn by subsequent suction while the cake is overlaid with a compressor belt 15, which is made porous enough to permit the free flow of water therethrough in the cake washing zone, the compressor belt serving to compact the cake to facilitate its dewatering and subsequent removal with the reenforcement. When the reenforcement takes the form of independent strands the roll 5 may be grooved peripherally to receive those strands and shear off the filter cake therefrom by the periphery of the roll between the grooves, and permit it to fall into a tank 9. The granular consistency of the material may, with some substances, be such that the cake will break up and fragments thereof fall into the tank 9 without recourse to cake discharge devices with the conveyor 4.

At this stage the substance is in the form of coarse grains with a spongy structure.

The water repelling step is carried on in the tank 9 and to this end I prefer to immerse the substance in fluid 10 in the tank 9, maintained at that temperature or between such temperatures at which, it is found, the substance is fluid repellant. In the example used by way of illustration that temperature is 120° F., below the boiling point of the entrained fluid. The temperature of the fluid may be maintained at the desired temperature by means of steam coils 11 or the equivalent. The fluid 10 may be, conveniently, water. In the interest of accuracy, it will, of course, be realized that the substance, as introduced into the fluid, will be at a temperature below that at which it is fluid repellant and that there will be a heat interchange between the fluid and the substance until the substance is raised to that temperature at which it is fluid repellant. When, therefore, we use the expression fluid (or liquid) raised to that temperature at which the substance is fluid repellant, we realize that additional heat units must be supplied to the fluid (or liquid) which are taken up by the substance so that the resulting temperature of the substance and fluid (or liquid) is that at which the substance is fluid repellant. The additional heat units supplied to the fluid (or liquid) may be readily determined and will depend in large measure upon the quantity of substance delivered to the fluid (or liquid) as well as the volume of the fluid (or liquid). So soon as the substance is raised to that temperature at which it is fluid repellant, of course, the temperature of both fluid (or liquid) and substance remains or is maintained at that temperature. Therefore by the expression "fluid (or liquid) raised to that temperature at which the substance is fluid repellant" is intended that temperature of the fluid (or liquid) which, after the aforesaid heat interchange has taken place, will maintain the substance of the required temperature to cause it to expel the entrained fluid.

So soon as the substance is immersed in the heated fluid 10 it is raised to that temperature and the entrained fluid expelled. The substance floats on or near the surface, as indicated at 12, and becomes soft and spongy. To permit the mass to be conveniently handled it is caused to agglomerate, that is, collect in lumps, which are found to float upon or close to the surface of the fluid 10. I have discovered that agitation will cause this agglomeration and to this end the tank 9 is provided with agitators in the form of rotating paddles 14.

The substance is next removed from the fluid 10 and the means, which are illustrated as having been adopted, comprise rakes or vanes 16 mounted upon the endless belt 17 travelling above the surface of the fluid and projecting downwardly within the fluid 10 a sufficient distance to collect and sweep along the substance before them through the tank and up onto the receiving and draining platform 19 from which the material falls into a hopper 21, fluid, i. e., fluid 10 and surface moisture, draining off back into the tank 9. Practically all entrained fluid is now expelled and surface moisture on the substance amounts to about 10%. About 6% of this moisture drains back while the material is on the draining platform so that as the material falls into the hopper it carries only about 4% of moisture on its surface. From the hopper it is permitted to fall between the pair of pressure rolls 22 from which the material falls in the form of somewhat spongy wax-like lumps onto a conveyor 23. The conveyor 23 is also preferably an endless belt of screen formation so that the moisture squeezed out by the pressure rolls 22 will fall through the screen.

The small amount of remaining surface moisture may then be removed by introducing the substance into a drying chamber. The belt 23 is shown as passing through a drying chamber 25 in which air warmed by steam pipes 26 is circulated through the screen conveyor by the fans 27, the belt extending through the opposite side of the drying chamber so that the material as it arrives at the end of the reach may fall off into a conveyor 28.

The time consumed in transit of the substance from the moment of its recovery from the slurry in the tank 1 to the container 28 may only be a matter of a few minutes as compared with several hours under the usual drying methods. For instance, the step of filtration may take about three minutes. Not more than one minute is required for the conveyance of the substance through the tank 9 and not more than three minutes is required for the substance to travel through the drying chamber 25. The speed of the conveyors 17 and 23 are regulated according to the substance to be treated, as will be obvious to one skilled in the art, and the speed of the filter drum 12 is so controlled as to permit the formation of adequate cake capable of satisfactory conveyance by the reenforcement 4.

Various modifications will occur to those skilled in the art in the type of apparatus used to carry out the invention. No limitation is intended in the materials which may be treated by this method but it is to be understood that the example given in the foregoing specification is given by way of illustration only and that the method which I have discovered may readily conform to the substances to be handled and dried by adapting the temperature of the fluid in the tank 9 to that temperature or range of temperatures at which the substance is fluid repellant.

What I claim is:—

1. The method of removing the entrained fluid from substances which are fluid repellant at a predetermined temperature which consists in subjecting the substance to a fluid raised to such temperature.

2. The method of removing the entrained fluid from substances which are fluid repellant within a predetermined range of temperatures which consists in subjecting the substance to a fluid at a temperature within such range.

3. The method of removing the entrained fluid from substances which are fluid repellant at a predetermined temperature which consists in subjecting the substance to fluid raised to a predetermined minimum temperature.

4. The method of removing the entrained fluid from substances which are fluid repellant at a predetermined temperature which consists in subjecting the substance to fluid raised to a predetermined maximum temperature.

5. The method of removing entrained fluid from substances which are fluid repellant at a predetermined temperature which comprises immersing the substance in a liquid raised to the predetermined temperature.

6. The method of removing the entrained fluid from substances which are fluid repellant within a predetermined range of temperatures which comprises immersing the substance in a liquid at a temperature within the predetermined range.

7. The method of removing the entrained fluid from substances which are fluid repellant at a predetermined temperature, which comprises immersing the substance in a fluid raised to a predetermined minimum temperature.

8. The method of removing the entrained fluid from substances which are fluid repellant at a predetermined temperature, which comprises immersing the substance in a liquid at a temperature below the predetermined maximum.

9. The method of removing the entrained fluid from substances which are fluid repellant at a predetermined temperature which consists in immersing the substance in a fluid similar to the entrained fluid and raising the temperature of such fluid to a predetermined value.

10. The method of removing the entrained fluid from substances which are fluid repellant at a predetermined temperature which comprises immersing the substance in a liquid raised to the predetermined temperature and removing the substance therefrom.

11. The method of removing the entrained fluid from substances which are fluid repellant at a predetermined temperature which comprises immersing the substance in a liquid raised to the predetermined temperature, removing this substance therefrom and passing the substance so removed between pressure rolls.

12. The method of drying a precipitate which comprises filtering the precipitate in a continuous manner, conveying the filter cake away from the filter, immersing the cake within a bath raised to a predetermined temperature, removing the material from the bath in a condition free from entrained fluid.

13. The method of drying a precipitate, water repellant at a predetermined temperature, which comprises recovering the precipitate, washing the precipitate, immersing the precipitate in a bath raised to the predetermined temperature and removing the precipitate from said bath.

14. The method of drying a precipitate, water repellant at a predetermined temperature, which comprises recovering the precipitate, washing the precipitate, compressing the precipitate, immersing the precipitate in a bath raised to the predetermined temperature, agglomerating the precipitate and removing the agglomerate.

15. The method of drying a precipitate, water repellant at a predetermined temperature, which comprises recovering the precipitate, washing the precipitate, compressing the precipitate, immersing the precipitate in a bath raised to the predetermined temperature, agitating the bath to cause agglomeration of the precipitate and removing the agglomerate.

16. The method of drying a precipitate, water repellant at a predetermined temperature, which comprises recovering the precipitate, washing the precipitate, compressing the precipitate, immersing the precipitate in a path raised to the predetermined temperature, agitating the bath to cause agglomeration of the precipitate, removing the agglomerate from the bath and permitting it to drain.

17. The method of drying a precipitate, water repellant at a predetermined temperature, which comprises recovering the precipitate, washing the precipitate, compressing the precipitate, immersing the precipitate in a bath raised to the predetermined temperature, agitating the bath to cause agglomeration of the precipitate, removing the agglomerate, permitting the agglomerate to drain, squeezing the agglomerate and flashing off surface moisture.

18. The method of drying a precipitate, water repellant at a predetermined temperature, which comprises recovering the precipitate, immersing the precipitate in a bath raised to the predetermined temperature, removing the precipitate from the bath, and squeezing the precipitate.

19. The method of drying a precipitate water repellant at a predetermined temperature, which comprises recovering the precipitate, immersing the precipitate in a bath raised to the predetermined temperature, removing the precipitate from the bath, squeezing the precipitate, and flashing off surface moisture.

20. The method of drying a precipitate, water repellant at a predetermined temperature, which comprises filtering the precipitate in a continuous manner, causing the formation of the precipitate about an endless conveyor, discharging the precipitate in a bath raised to the predetermined temperature, agitating the bath to cause agglomeration of the precipitate, removing the agglomerate from the bath, draining the agglomerate, compresing the agglomerate, and passing the agglomerate through a drying chamber.

21. The method of removing the entrained fluid from substances which are fluid repellant at a predetermined temperature which comprises immersing the substance in a liquid raised to the predetermined temperature and agitating the substance in the fluid.

22. The method of drying substances having the characteristics of a precipitate obtained by treating a gum with an alkali and acid, which precipitate has the property of becoming suddenly fluid repellant when raised to a certain critical temperature, consisting in heating the substance to said critical temperature, which temperature is below the boiling point of the entrained fluid.

In testimony whereof I affix my signature.

GEORGE W. O'KEEFFE.